May 26, 1959     E. E. KNITTEL     2,888,115
COMBINED CLUTCH AND BRAKE

Filed Oct. 12, 1956     2 Sheets-Sheet 1

INVENTOR.
Emil E. Knittel
BY Howard G. Russell
his ATTORNEY

May 26, 1959

E. E. KNITTEL 2,888,115

COMBINED CLUTCH AND BRAKE

Filed Oct. 12, 1956

INVENTOR.
Emil E. Knittel
BY
Howard G. Russell
his ATTORNEY

United States Patent Office 2,888,115
Patented May 26, 1959

2,888,115

COMBINED CLUTCH AND BRAKE

Emil E. Knittel, Malverne, N.Y.

Application October 12, 1956, Serial No. 615,665

7 Claims. (Cl. 192—18)

This invention relates to improvements in clutches designed alternately to drive and arrest a driven member.

My co-pending patent application Serial No. 545,767 of November 8, 1955, now Patent No. 2,796,308 dated June 18, 1957, discloses a rotary power operated card file in which a wheel or drum having peripheral file-card containing compartments is selectively driven or arrested to bring any specific compartment into the position in which file cards may be inserted or removed.

This is accomplished by means of two continuously driven shafts rotating in opposite directions and two clutches, one for each shaft, which may be engaged, disengaged or arrested at the option of the operator.

My power driven card file constitutes a representative example of the application and use of the type of clutch to which this invention relates.

My improved clutch is of course not limited to the aforementioned use, but may be employed with equal advantage where a member, be it a gear, sprocket, belt pulley, hereinafter collectively referred to as "pulley" or "driven pulley," is to be intermittently driven and arrested or is to be driven, permitted to free-wheel, and arrested.

My improved clutch lends itself admirably to applications where compactness of construction, reliability in operation, minimum of wear, ready accessibility and simplicity of construction are essential.

These and various other objects, features, and advantages of this invention will appear more fully from the detailed description which follows, accompanied by drawings showing, for the purpose of illustration, a preferred embodiment of the invention. The invention also resides in certain new and original features of construction and combination of elements hereinafter set forth and claimed. Although the characteristic features of this invention which are believed to be novel will be particularly pointed out in the claims appended hereto, its objects and advantages and the manner in which it may be carried out may be better understood by referring to the following description taken in connection with the accompanying drawings forming a part of it, in which:

Figure 1:
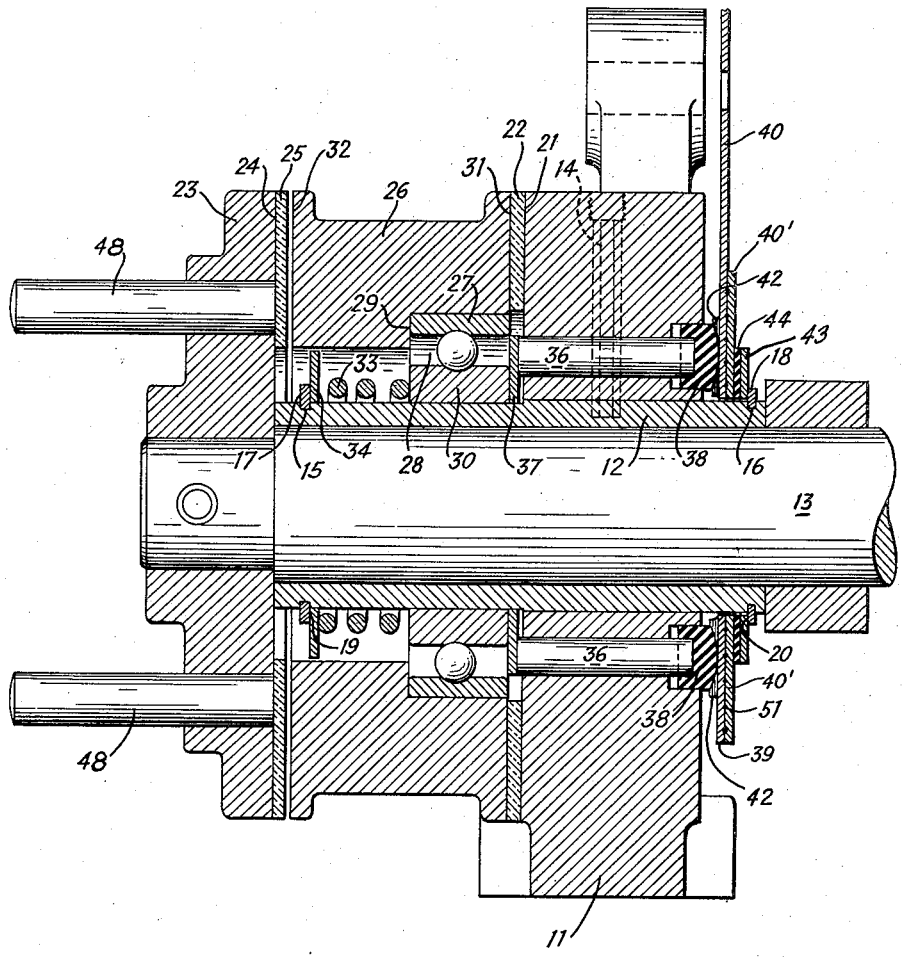
Fig. 1 is a vertical cross section through a preferred form of my clutch.

In the following description and in the claims various details will be identified by specific names for convenience. These names are, however, intended to be generic in their application. Corresponding reference characters refer to corresponding parts of the drawings.

The drawings accompanying, and forming part of, this specification disclose certain specific details for the explanation of broader aspects of the invention, but it is understood that details may be modified in various respects without departure from the principles of the invention, and that the invention may be embodied in other forms than the one shown.

Referring to the drawings, a stationary member or support 11 is provided with a tubular bearing portion 12 through which a drive shaft 13 extends. The tubular portion may be integral with the support, but is preferably made in the form of a porous bronze bushing of the lubricant-storing type. The bushing is press-fitted in the support and is suitably arrested against longitudinal movement by a hollow lengthwisely slotted pin 14, a so-called "roll pin" which serves the dual purpose of fixing the bushing 12 in the support 11 and providing an oil passage to the porous bushing.

Peripheral grooves 15 and 16 are machined adjacent either end of the bushing 12 to receive snap rings 17 and 18 forming shoulders 19 and 20 on the tubular portion 12.

The stationary support has a lateral friction surface 21 preferably fitted with a clutch lining 22. Experience has shown that linings composed of granulated cork and a neoprene binder have desirable friction and wear characteristics.

A drive disc 23 is fixedly mounted on the drive shaft. This drive disc also has a lateral friction surface 24 fitted with a clutch lining 25 and faces, but is spaced from, the friction surface 21 of the support 11.

A driven member is rotatably mounted between the friction surfaces 21 and 24. This driven member may have any desired form depending on whether a gear, a chain, or a belt is to be driven and is herein collectively referred to as "pulley." In the illustrated example the pulley 26 serves to drive a belt (not shown). The pulley 26 is shaped and machined to receive the outer ring or race 27 of an antifriction bearing 28 capable of sustaining a certain amount of thrust.

The outer race 27 of the bearing 28 is press-fitted and rests against a shoulder 29 of the pulley. The inner race or ring 30 is slidably mounted on the tubular portion or bushing, thereby permitting the pulley 26 to be slid towards either the support 11 or the drive disc 23, as the case may be. The pulley has two lateral friction surfaces 31 and 32 preferably of machined cast iron adapted to be engaged by the clutch linings 22 and 25.

A helical compression spring 33 is fitted between the inner race 30 and the shoulder 19 for urging the pulley into engagement with the stationary friction surface 21, 22. In order to provide an enlarged engagement surface for the spring, a washer 34 may be provided. It is evident that in the illustrated construction the force with which the pulley bears against the stationary friction surface 21, 22 is determined, and limited by, the force of the spring 33.

The pulley 26 may be moved in the opposite direction into engagement with the drive disc 23 by a plurality of clutch pins 36 extending through the stationary support and bearing against the inner race 30. A washer 37 may be provided to enlarge the area of engagement.

The clutch pins have enlarged heads 38, preferably of a wear resistant plastic material such as "nylon" and rest against an actuating member designed to displace the pins in an axial direction in order to urge the pulley 26 against the drive disc 23.

Figure 2:
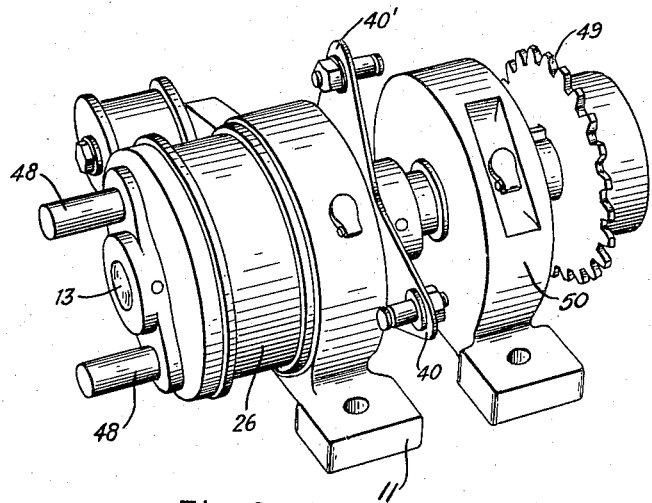
Fig. 2 is a perspective view of the clutch of Fig. 1.

In the illustrated embodiment the actuating member is constructed in the form of a levered cam disc 39 having an arm 40, a central aperture 41 fitting the diameter of the tubular portion 12 and appropriate cam surfaces 42 for engaging the heads 38 of the clutch pins 36. The cam surfaces 42 are preferably produced by a stamping operation. Two arms 40 and 40' may be provided by spot welding two sheet metal blanks together at 51 so that their arms extend at an angle as shown in Figure 2.

Figure 3:
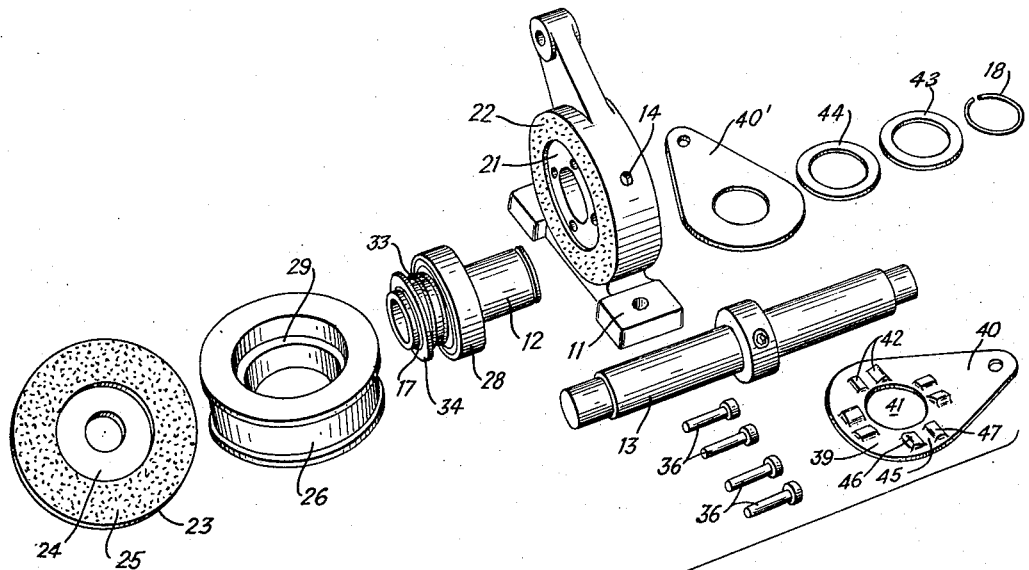
Fig. 3 is an exploded view showing certain elements of the clutch.

Only one of the two sheet metal blanks carries the cam surfaces 42 as shown in Figure 3.

The levered cam disc may be rotated by an appropriate operating linkage (not shown) attached to the arm 40 or the arm 40′ and is held against axial motion on the tubular portion 12 by the shoulder 20. A metal washer 43 may be provided to furnish an enlarged thrust surface and an antifriction member 44 capable of sustaining thrust force is fitted between the actuating cam disc 39 and the shoulder structure 20, 43. A plastic washer of "Teflon" has proved suitable and most durable for this purpose. It requires no lubrication and shows no detectable wear after several hundred thousands of clutch operations.

As shown in Figure 3 one or several cam surfaces 42 may be provided. The construction of Figure 3 is specifically designed to permit three distinct positions of the clutch. In a first, central position the clutch pin engages a depressed area 45 in which there is no thrust on the pins 38 and the pulley rests against the stationary support. This is the brake position.

If the cam disc 39 is rotated in one direction, the tapered cam surface or portion 46 engages the pins and urges the pulley 26 against the drive disc 23. This is the drive position.

If the cam disc 39 is rotated in the opposite direction, the elevated portion 47 of lesser elevation than the peak of the tapered portion 46 engages the pins and causes the pulley to be axially shifted into a position in which it neither engages the friction surface 21, 22 of the support 11 nor the friction surface 24, 25 of the drive disc 23. This position may be called free-wheeling position.

The total of the pulley movement from the braked to the driven position is of the order of 1 to 1.5 millimeters.

The drive disc 23 may be provided with drive pins 48 to drive the shaft of an adjacent clutch assembly as described in my above mentioned Patent No. 2,796,308 and the shaft 13 may be driven by a motor through a chain engaging the chain sprocket 49. A bearing 50 is shown adjacent the chain sprocket 49.

What is claimed is:

1. A combined clutch and brake, comprising, in combination, a stationary bearing support having a first lateral friction surface; a bearing bushing fixedly mounted in said support, one end of the bushing protruding beyond said friction surface; a drive shaft journaled in said bushing; a drive disc fixed on said shaft beyond the end of said bushing, said disc having a second lateral friction surface which faces, but is spaced from, said first friction surface on said support; a pulley between said support and said drive disc, said pulley having two oppositely facing lateral friction surfaces, one of said lateral pulley surfaces being adjacent said first friction surface, the other lateral pulley surface being adjacent said second friction surface; bearing means for rotatably and laterally slidably supporting said pulley on said bushing between said support and said disc; a spring urging said pulley towards said support; a plurality of pins extending through, and axially slidable with respect to, said support for laterally displacing said pulley away from said support; and cam means for moving said pins in the direction of said driven disc for urging said pulley into contact with said driven disc against the action of said spring, said cam means being mounted on the side of said support which is remote from said drive disc.

2. A combined clutch and brake, comprising, in combination, a stationary bearing support having a first lateral friction surface; a bearing bushing fixedly mounted in said support, one end of the bushing protruding beyond said friction surface; a drive shaft journaled in said bushing; a drive disc fixed on said shaft beyond said end of the bushing, said disc having a second lateral friction surface which faces, but is spaced from, said first friction surface on said support; a pulley between said support and said drive disc, said pulley having two oppositely facing lateral friction surfaces, one of said lateral pulley surfaces being adjacent said first friction surface, the other lateral pulley surface being adjacent said second friction surface; bearing means for rotatably and laterally slidably supporting said pulley on said bushing between said support and said disc; a spring urging said pulley towards said support; a plurality of pins slidably extending through said support for laterally displacing said pulley; and a cam disc rotatable on said bushing on the far side of said support with respect to said pulley, said cam disc having cam surfaces engaging said pins to displace said pins axially upon rotation of the cam disc.

3. A combined drive shaft, clutch and brake unit comprising, in combination, a stationary bearing support including a tubular bearing bushing portion having two terminal shoulders thereon and a first lateral friction surface substantially transverse to, and surrounding, said tubular portion, one end of said bushing portion protruding beyond said first surface; a drive shaft internally journaled in said tubular portion; a drive disc fixed on said shaft beyond the one end of said tubular portion, said disc having a second lateral friction surface which faces, but is spaced from, said first friction surface; a pulley between said support and said drive disc, said pulley being externally supported on one end of said tubular portion for rotation and axial displacement with regard to said tubular portion, said pulley having two further opposite lateral friction surfaces adjacent said first and second surfaces, respectively; a spring bearing against one of said terminal shoulders for urging said pulley towards said support; a plurality of pins slidably extending through said support for displacing said pulley into contact with said driven disc against the action of said spring; and cam means on said support for axially moving said pins, said cam means bearing against the other of said terminal shoulders.

4. A combined drive shaft, clutch and brake unit comprising, in combination, a stationary bearing support including a tubular bearing bushing portion having two terminal shoulders thereon, said support having a first lateral friction surface substantially transverse to, and surrounding, said tubular portion, one end of said bushing portion protruding beyond said first surface; a drive shaft internally journaled in said tubular portion; a drive disc fixed on said shaft beyond the one end of said tubular portion, said disc having a second lateral friction surface which faces, but is spaced from, said first friction surface; a pulley externally supported on said tubular portion for rotation and axial displacement with regard to said tubular portion, said pulley having two further opposite lateral friction surfaces; a spring bearing against one of said terminal shoulders for urging said pulley towards said support; a plurality of pins slidably extending through said support for laterally displacing said pulley against the action of said spring; and an actuating cam disc for axially moving said pins, said cam disc bearing against the other of said terminal shoulders and having three cam portions, one elevated portion in which the pins urge said pulley against said drive disc, another elevated portion in which the pulley is spaced from the friction surfaces of the support and disc and is free to idle, and an intermediate portion in which the pins are released and the spring urges said pulley against said support.

5. A combined drive shaft, clutch and brake unit comprising, in combination, a stationary bearing support including a tubular bearing bushing portion having two terminal shoulders thereon, said support having a first lateral friction surface substantially transverse to, and surrounding, said tubular portion, one end of said bushing portion protruding beyond said first surface; a drive shaft internally journaled in said tubular portion; a drive disc fixed on said shaft beyond the end of said tubular portion, said disc having a second lateral friction surface which faces, but is spaced from, said first friction surface; a pulley externally supported on said tubular portion for rotation and axial displacement with regard to said tubular portion, said pulley having two further opposite lateral friction surfaces; a spring bearing against one of said terminal shoulders for urging said pulley towards said support; a plurality of pins slidably extending through said support for laterally displacing said pulley against the action of said spring; and a cam disc rotatably mounted on said tubular portion and bearing against the other of said terminal shoulders, said cam disc having cam surfaces engaging said pins to displace said pins axially upon rotation of the cam disc.

6. A combined drive shaft, clutch and brake unit comprising, in combination, a stationary bearing support including a tubular bearing bushing portion having a terminal shoulder, said support having a first lateral friction surface substantially transverse to, and surrounding, said tubular portion; a drive shaft internally journalled in said tubular portion; a drive disc fixed on said shaft beyond the end of said tubular portion, said disc having a second lateral friction surface which faces, but is spaced from, the friction surface of the support; an antifriction bearing laterally slidable on said tubular portion towards, and away from, said disc, said bearing having an inner and an outer race; a spring between one of said terminal shoulders and said inner race for urging said bearing towards said support; a driven pulley on the outer race of said bearing, said pulley having two opposite lateral friction surfaces; a plurality of pins slidably extending through said support and bearing against the inner race of said bearing, adapted upon axial displacement to move said bearing and pulley into contact with said driven disc against the action of said spring; and a cam disc rotatably mounted on said support, said cam disc having cam surfaces engaging said pins, there being two cam portions for each pin, a first slanted cam portion for displacement of said pins from zero to maximum displacement, a second cam portion for displacement of said pins less than maximum displacement, a depressed portion lying between said first and second cam portions.

7. A combined clutch and brake comprising, in combination, a stationary bearing support having a lateral friction surface; a fixed bushing in said support, said bushing having peripheral grooves adjacent either end adapted to receive snap rings; a drive shaft extending through said bushing; a drive disc fixed on said shaft, said disc having a lateral friction surface which faces, but is spaced from, the friction surface of said support; an antifriction bearing laterally slidable on said bushing between said support and said disc, said bearing having an inner and an outer race; a first snap ring in the one groove adjacent said drive disc, said snap ring forming a first shoulder; a compression spring acting between said shoulder and said inner race for urging said bearing towards said support; a driven pulley fixed on the outer race of said bearing, said pulley having two opposite lateral friction surfaces; a plurality of pins slidably extending through said support and bearing against said inner race; a cam disc rotatably mounted on said bushing adjacent the other groove; a second snap ring in said second groove forming a second shoulder; an antifriction thrust washer between said cam disc and said second shoulder, said cam disc having cam surfaces engaging said pins, there being two cam portions for each pin, a first slanted cam portion for displacement of said pins from zero to maximum displacement, a second cam portion for displacement of said pins less than maximum displacement, a depressed portion lying between said first and second cam portions.

References Cited in the file of this patent

UNITED STATES PATENTS

| | | |
|---|---|---|
| 2,252,906 | Williamson | Aug. 19, 1941 |
| 2,675,105 | Kelley | Apr. 13, 1954 |

FOREIGN PATENTS

| | | |
|---|---|---|
| 7,662 | Great Britain | Apr. 12, 1899 |
| 826,391 | Germany | Nov. 22, 1951 |